United States Patent [19]

Kawasaki

[11] Patent Number: 5,167,801
[45] Date of Patent: Dec. 1, 1992

[54] FILTER PRESS WITH CAKE REMOVING DEVICE

[75] Inventor: Hiroichi Kawasaki, Sakaide, Japan

[73] Assignee: Ishigaki Mechanical Industry Co., Ltd., Tokyo, Japan

[21] Appl. No.: 718,594

[22] Filed: Jun. 21, 1991

[51] Int. Cl.$^5$ .............................................. B01D 25/34
[52] U.S. Cl. .................................. 210/106; 210/225; 100/198
[58] Field of Search ................. 210/225, 86, 106, 384, 210/407–409; 100/198; 177/132, 225, DIG. 6

[56] References Cited

U.S. PATENT DOCUMENTS 3,578,170 5/1971 Kurita ................................. 210/230

FOREIGN PATENT DOCUMENTS

WO89/06155 7/1989 PCT Int'l Appl. ................. 210/225

*Primary Examiner*—Mary Lynn Theisen
*Assistant Examiner*—Matthew O. Savage
*Attorney, Agent, or Firm*—Kennedy & Kennedy

[57] ABSTRACT

A filter press is provided with filter plates supported vertically in a horizontal row in a frame structure and with filter cloth disposed between the filter plates for treating slurries introduced between the filter plates. The filter press includes bars supported at a height above the filter plates to support the filter cloth, shafts disposed orthogonally under the bars, cylinders to move the shafts toward and away from the bars, and vibrators mounted on the shafts to vibrate the shafts. The shafts are moved to come into contact with the bars, and the vibrators are actuated to make the bars vibrate to drop cake remaining on the filter cloth when the filter plates are opened. The filter press further includes photoemissive and photoreceptive devices for detecting deflection and sinking of the bars due to weight of the cake on the filter cloth, and wash pipes for washing down the filter plates and filter cloth.

7 Claims, 4 Drawing Sheets

FILTER PRESS WITH CAKE REMOVING DEVICE

BACKGROUND OF THE INVENTION

1. Field of the Invention

This invention relates to a filter press, and in particular to a filter press provided with devices for removing filter cake or sludge from filter cloth, such as filter cloth vibrating devices, washing devices and so on.

2. Description of the Prior Art

In the prior art, a filter press with vibrating devices for vibrating filter cloth for removing filter cake is well known as disclosed in Japanese Patent (Y2) 56-33,614. Also, a filter press with filter cloth washing machine is well known as disclosed in Japanese Patent (A) 54-51,069.

In these devices, filter cloth is vibrated for a certain time, or a number of times. After the vibration, the filter cloth is usually washed for a certain time.

However, these devices sometimes fail to remove a part or the whole of the filter cake because the vibration and washing are not enough to drop it if the cake is adhesive or difficult to remove. In particular, the filter cake tends to remain partially at a lower part of a seal portion of a filter plate. In addition, a conventional filter press is now provided with a device or sensor for detecting if the filter cake is removed from the filter cloth. Hence, the filter cloth wears down partly if the filter press is used without removing the cake completely from the filter cloth and the filter plates.

SUMMARY OF THE INVENTION

It is therefore the primary object of the present invention to provide an improved filter press which can remove filter cake completely from filter cloth and filter plates.

It is a second object of the present invention to provide a filter press provided with a sensor for detecting if the filter cake is removed from the filter cloth and the filter plates.

The filter press of the present invention includes a plurality of filter plates supported vertically in a horizontal row in a frame and filter cloth disposed between the filter plates for treating slurries introduced under pressure between the filter plates, and further includes a plurality of bars extended over full width of the filter plates and supported at a predetermined height above the filter plates for supporting the filter cloth, at least one shaft disposed substantially orthogonally to the bars at a predetermined place adjacent to and however detached from the bars, and movable to come into contact with the bars, at least a driving device for moving the shaft towards and away from the bars, and at least one vibrating device for vibrating the shaft.

The shaft is moved by the driving device to come into contact with the bars, and the vibrating device is actuated to make the bars vibrate through the shaft to drop the cake remaining on the filter cloth when the filter plates are opened.

The bars are supported on springs at supporting points in an embodiment, and further springs are disposed on the bars at the supporting points in an embodiment, thereby the bars are vibrated efficiently on the springs or between the springs when the shaft is vibrated.

The filter press of the present invention further includes devices to detect deflection and sinking of the bars due to weight of the remaining cake on the filter cloth. If the deflection and/or sinking is detected, the bars are vibrated to remove the filter cake.

The filter press of the present invention further includes devices to wash down the filter cloth and filter plates to remove the remaining cake or sludge. Therefore, cake or sludge is completely removed from the filter cloth and filter plates according to the filter press of the present invention.

DESCRIPTION OF THE PREFERRED EMBODIMENTS

Now further objects and examples of the present invention will be described in detail with reference to the accompanying drawings.

Figure 1:
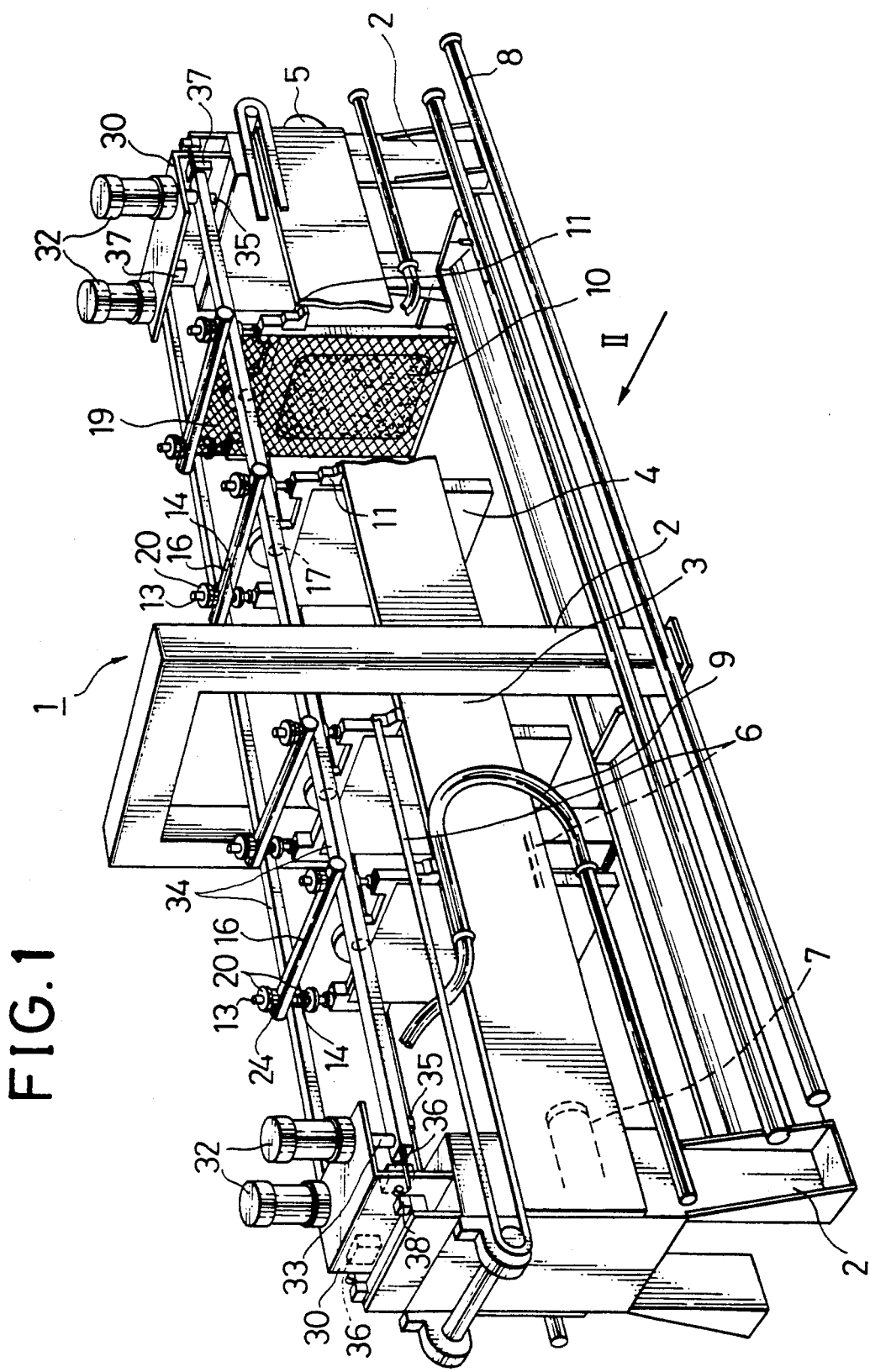
FIG. 1 is a perspective drawing showing a filter press of the present invention.

In FIG. 1, a filter press 1 of the present invention is shown. The filter press 1 has a frame structure mainly consisting of three frames 2 and a pair of horizontal beams 3 fixed to both sides of the frames 2. A plurality of filter plates 4 are disposed vertically in the frame structure 2, 3. Each of the filter plates 4 has a pair of arms 11 at both sides and is slidably supported on the beams 3 through the arms 11.

Now, general structure of the filter press is briefly explained. The structure is known in the prior arts. The filter plates 4 are moved horizontally along the beams 3 to close to one another by use of chains 6 connected to both sides of the filter plates 4. The chains 6 are driven by a motor 5. After the filter plates 4 are closed, the filter plates 4 are clamped by activating a clamping cylinder 7 wile slurry is fed under pressure from a feed hose 9 through a hole 17 formed at the top of the filter plate 4 into a filter room consisting of depressions 18 formed in two adjacent filter plates 4. Filtrate which has passed through filter cloth 19 is discharged from discharging holes (not shown) disposed in the filter plates 4. Therefore, filter cake 10 remains on filter cloth in a filter room or depressions 18, 18 of the filter plates 4.

Then, compressed air is introduced into the room 18, 18 through the filtrate discharging holes to detach the filter cake 10 from the filter cloth 19 and the filter plates 4. After it, the filter plates 4 are opened as shown in FIG. 1, and subsequently filter cake 10 is dropped, or discharged from the plates 4 due to its weight.

The filter press 1 is provided with some devices which are features of this invention. The devices detect if filter cake 10 remains on filter cloth 19 and remove the filter cake 10 remaining on the filter cloth 19 by vibrating and washing the filter cloth 19. Now, description is made about the devices.

Figure 2:
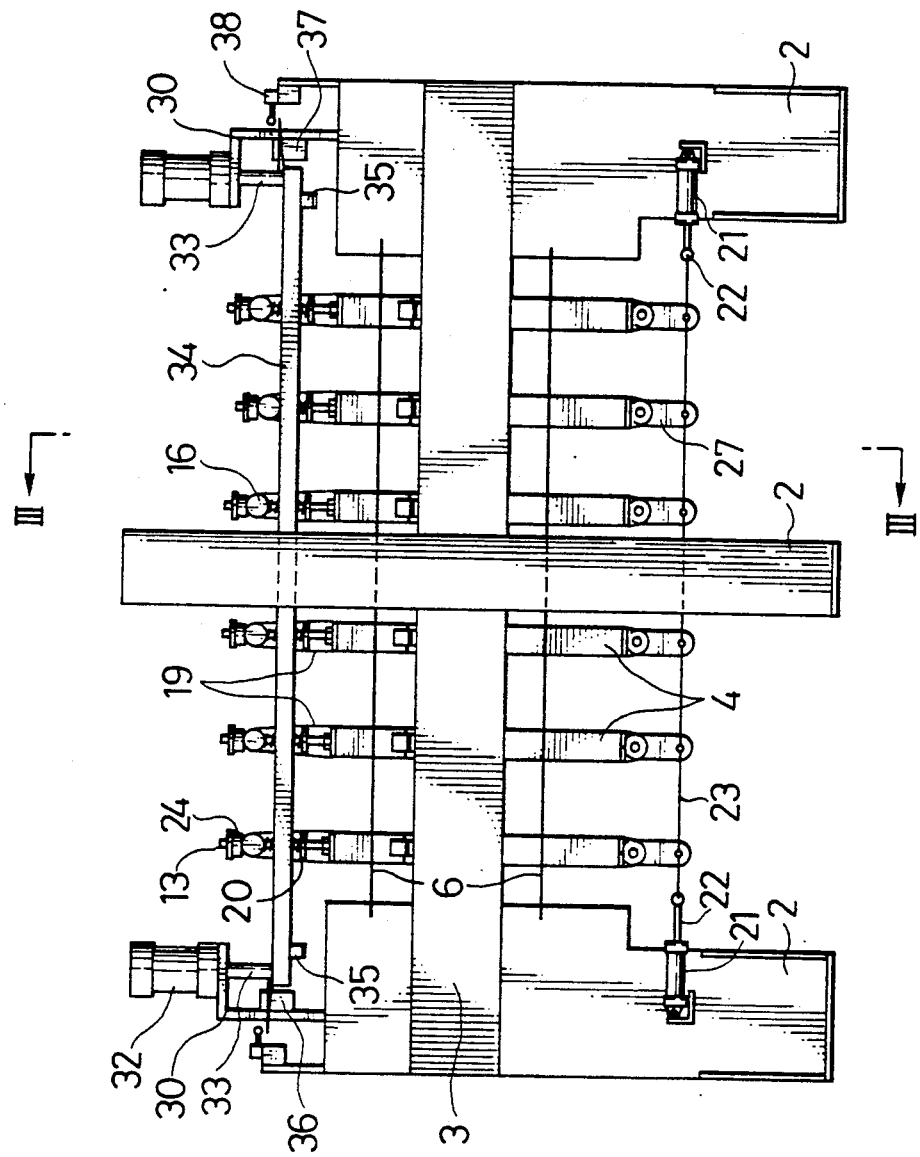
FIG. 2 is a front schematic view of the filter press taken on an arrow II shown in FIG. 1.

In FIGS. 1 and 2, a pair of brackets 30 are mounted on the frames 2. The brackets 30 extend rearwards along the frames 2. A pair of fluid cylinders 32 are mounted on both ends of each of the brackets 30, and piston rods 33 of the cylinders 32 extend downwards through holes formed in the brackets 30. A pair of shafts 34 extended between the frames 2 are fixed to free ends of the piston rods 33 of the fluid cylinders 32 so that the shafts 34 can be supported by the piston rods 33 to move vertically when the cylinders 32 are actuated.

Figure 3:
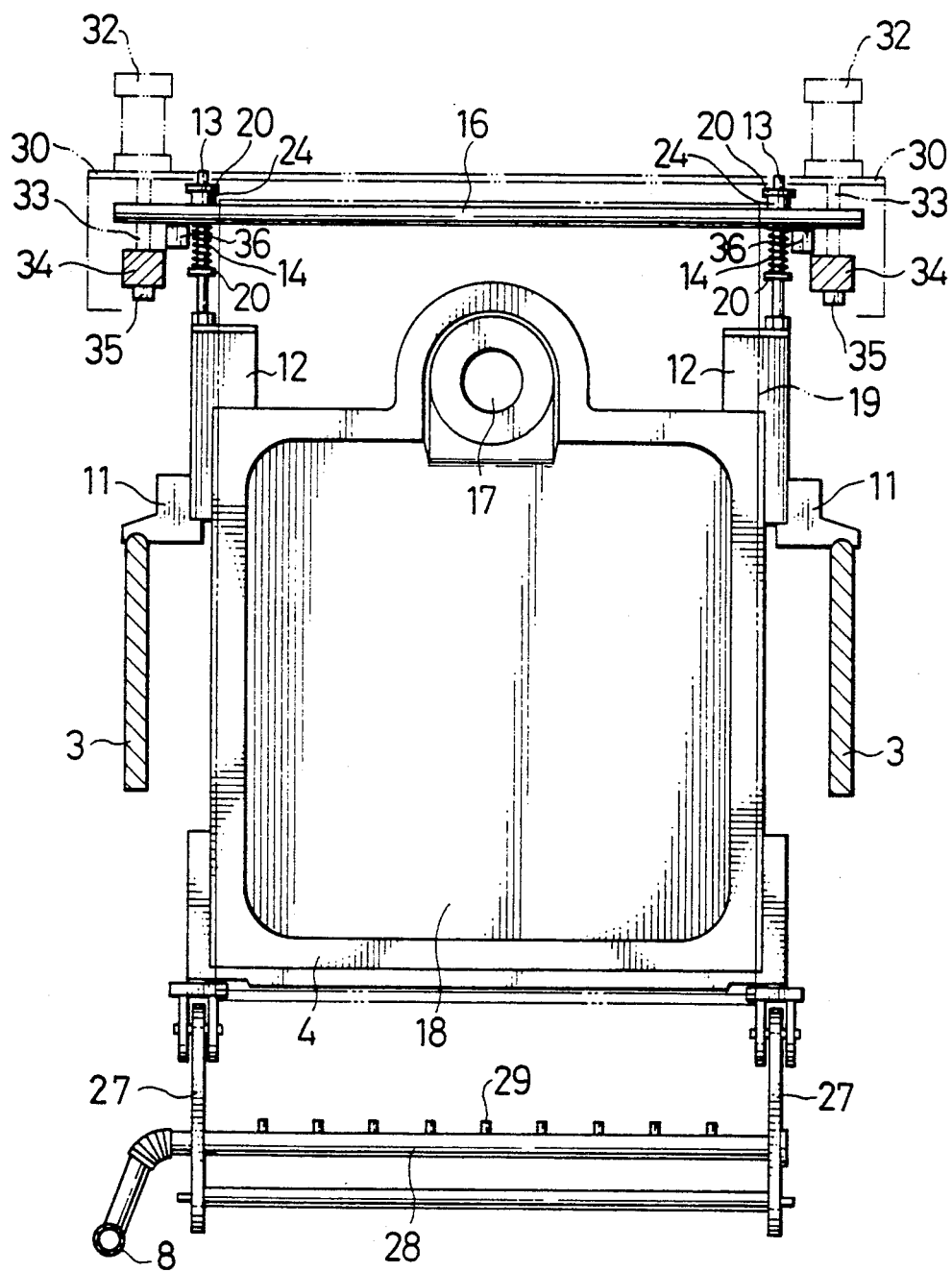
FIG. 3 is an enlarged sectional side view of the filter press, taken on the cutting plane line III—III in FIG. 2.

On the other hand as shown in detail in FIG. 3, the filter plate has a pair of shoulders 12 at both sides, and a pair of upright round bars 13 are fixed to the shoulders 12. Lower and upper spaced plates 20 are fixed to each of the upright round bars 13. A spring 14, for example, coil spring is disposed on the lower plate 20 and around the upright round bar 13. A horizontal bar 16 extended over full width of the filter plate and having holes (not shown) at both sides is mounted on the springs 14, 14 while the upright round bars 13 penetrate the horizontal bar 16 through the holes. A pad is inserted between the upper plate 20 and the horizontal bar 16. Therefore, the horizontal bar 16 normally lies at a predetermined height above the filter plate and vibrates between the upper and lower plates 20 when subject to vertical impact force or vibrating force.

Figure 4:
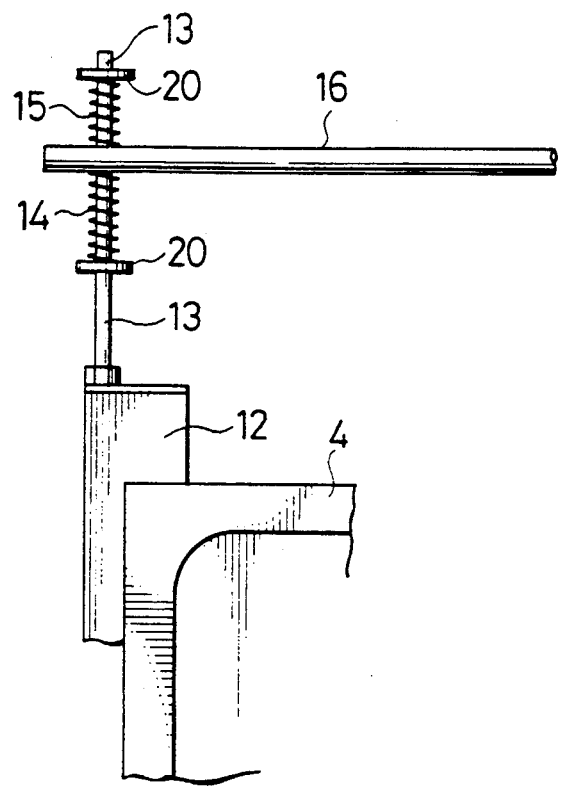
FIG. 4 is a side view showing a device of the filter press for enhancing vibration of a bar which supports filter cloth between filter plates.

A further coil spring 15 may be disposed around the upright round bar 13 but on the horizontal bar 16 as shown in FIG. 4, so that the spring 15 is between the upper plate 20 fixed to the upright round bar 13 and the horizontal bar 16. In this case, the horizontal bar 16 for supporting the filter cloth 19 is vibrated efficiently between the upper and lower plates 20 when subject to impact load or vibrating force.

Filter cloth 19 is hung from the horizontal bar 16 and extended downwards up to a lower end of the filter plate.

The two shafts 34 extending in the longitudinal direction orthogonal to the horizontal bars 16 are below both ends of the horizontal bars 16, or detached from the horizontal bars 16. Each of the shafts 34 are provided with at least one vibrator 35, however, for example, two vibrators 35 are mounted on both ends of the shaft 34 as shown in FIG. 2. Preferably, the vibrator 35 may be mounted on the shaft 34 at each point under the horizontal bars 16.

Figure 5:
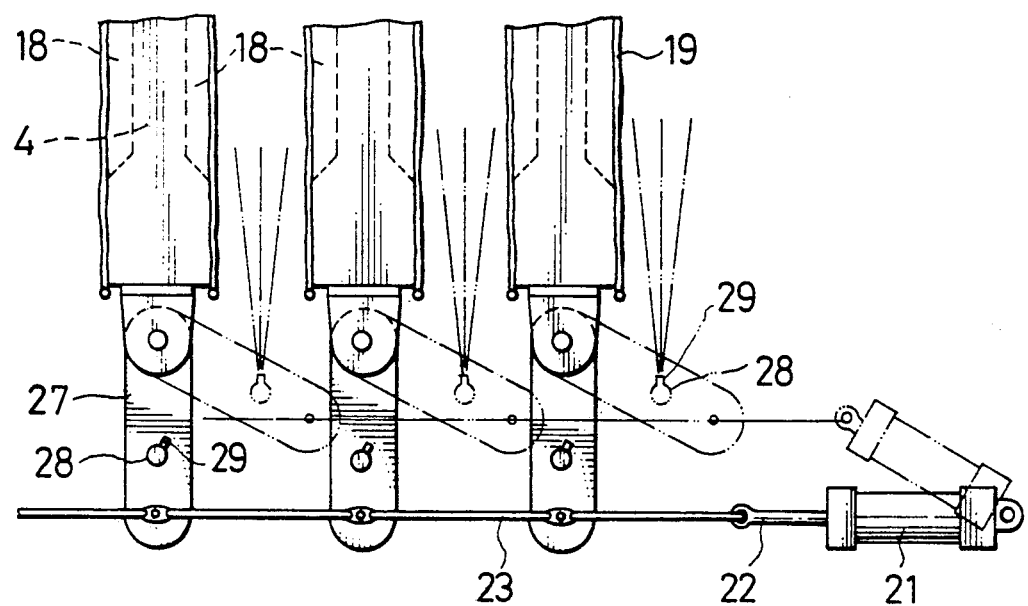
FIG. 5 is an enlarged partial front view of the filter press, showing a washing device disposed at lower ends of filter plates of the filter press.

The filter plate 4 is provided at lower corners with a pair of levers 27 which are rotatable around an axis parallel to the horizontal bar 16 as shown in FIGS. 2, 3 and 5. A wash head pipe 28 extended over the width of the filter plate is fixed to the levers 27. The wash head pipe 28 has a plurality of nozzles 29 spaced along the head pipe 28, and is connected to a water feed pipe 8.

At least a pair of fluid cylinders 21 facing each other are rotatably mounted on the frames 2. The levers 27 are connected not only to one another but also to free ends of piston rods 22 of the cylinders 21 by wires 23 so that ends of the wires 23 can be free to rotate with the levers 27 and the piston rods 22 at connecting points.

Therefore, all the levers 27 are rotated at the same time, and the nozzles 29 are faced towards a surface of the filter plate when one of the two piston rods 22 is plunged into the cylinder 21 and the other is extruded.

A pair of photoemissive devices 36 are mounted on the left-hand bracket 30 while a pair of photoreceptive devices 37 facing the photoemissive devices respectively are mounted on the right-hand bracket 30 (FIGS. 1 and 2). The photoreceptive device 37 may be a CCD camera, photo tube, or other known sensor. Light beams emitted from the photo emissive devices 36 pass under the horizontal bars 16 which are at the predetermined height and are sensed by the photoreceptive devices 37 when all the horizontal bars 16 lie at the height and do not obstruct the beams. If the beams are obstructed by some of horizontal bars 16 deflected and/or sunk, the photoreceptive devices 37 can not sense the beams. Therefore, it is understood that filter cake 10 is remaining on the filter cloth 19 of one or some of horizontal bars 16.

Now, description will be made about the use of the devices for removing remaining cake 10. When the filter plates 4 are opened, the horizontal bars 16 go down suddenly due to the weight of the cake 10 on the filter cloth 19 causing the springs 14 under the horizontal bars 16 to contract to the minimum size and come into collision with the lower plates 20 Hence, the cakes 10 drop from the filter plates due to the impact caused by the collision. However, a part or the whole of the cake 10 remains sometimes in one or more of the filter plates, and sludge still adheres to the filter cloth 19 of all the filter plates 4.

If the remaining cake 10 is detected by the photoemissive and photoreceptive devices 36, 37, the fluid cylinders 32 are actuated to plunge the piston rods 33 to lift the shafts 34 and therefore the horizontal bars 16 until the horizontal bars 16 are raised up to the predetermined height, or a higher level than the predetermined height when upper springs 15 are disposed on the horizontal bars 16 as shown in FIG. 4. Limit switches 38 are mounted on the frames 2 to detect if the shafts 34 are at a certain height where the horizontal bars 16 are at the predetermined height or level and to disactivate the cylinders 32 when the shafts 34 are at the certain height.

By the operation of the limits switches 38, the shafts 34 suddenly fall down to a lowest position which is lower than the lower plate 20. Therefore, the horizontal bars 16 are vibrated on the springs 14 or between the springs 14 and 15. As a result of the vibration, the remaining cake 10 is dropped from the filter cloth 19. Whether the cake 10 is removed is detected by the photoemissive and photoreceptive devices 36, 37. The shafts 34 are again raised, if necessary as a result of the detection.

After the cake 10 is removed from the filter cloth 19, then sludge adhering to the filter cloth 19 and filter plates are removed. To remove the sludge, the shafts 34 are raised by activating the cylinders 32 until they come into contact with both ends of the horizontal bars 16 which are lying at the predetermined height after the vibration. Then, the vibrators 35 mounted on the shafts 34 are activated to give the horizontal bars 16 vibrations. The vibrations of the horizontal bars 16 are enhanced because the bars 16 are on the spring 14, or between the springs 14 and 15. While the horizontal bars 16 are vibrated, the rotating cylinders 21 are successively activated so that the nozzles 29 of the wash head pipe 28 supplied with water from the water feed pipe 8 can wash down every part of the filter cloth 19 and of the surfaces of the filter plates.

Accordingly, the cake and sludge are completely removed from the filter cloth 19 and plates 4.

In the above description, the filter press is provided with the shafts 34 for vibrating the horizontal bars 16. However, the shafts 34 may be removed from the filter press 1. In this case, vibrators 35 are attached directly to the horizontal bars 16. Therefore, the horizontal bars 16 are vibrated on spring 14 or between the springs 14 and 15 by the vibrators 35 mounted on the bars 16.

In addition, the springs 14 and 15 may be removed from the filter press 1. In this case, the deflection of the horizontal bars 16 due to the remaining cake is detected by the sensors, and then the cake is dropped by vibrating of the bars 16 with the vibrators 35.

It is clear that any combination of elements which are features of the present invention is made not limiting the examples described above.

I claim:

1. A filter press provided with a plurality of filter plates supported vertically in a horizontal row in a frame structure and with filter cloth disposed between said filter plates for treating slurries introduced under pressure between said filter plates, the improvement comprising:
   a plurality of bars extending over the full width of said filter plates at a predetermined height above said filter plates for supporting said filter cloth,
   each filter plate including a first pair of springs mounted above each said filter plate and under each said bar on bar supporting rods attached to said filter plate, said springs support said bars upon said filter plates at said predetermined height above aid filter plates for causing said bar to vibrate on said spring when said bar is subjected to force,
   a pair of shafts disposed substantially orthogonally to said bars between aid bars and said filter plates, said shafts being movable to come into contact with said bars,
   driving devices for moving said shafts towards and away from said bars, and
   vibrating devices for vibrating said shafts.

2. The filter press according to claim 1, wherein a second pair of springs is mounted on a side of each of said bars opposite that of said first pair of springs on said bar supporting rods for causing said bars to vibrate between said first pair of springs and said second pair of springs when said bar is subjected to force.

3. The filter press according to claim 1, wherein said driving devices comprise a fluid cylinder mounted at each end of said shafts, each fluid cylinder having a piston rod and wherein said shafts are supported at both ends by free ends of said piston rods and said shafts are positioned to lie under both ends of said bars, and thereby moved towards and away from said ends of said bars.

4. The filter press according to claim 1 or 2, wherein said filter press includes a pair of photoemissive devices and photoreceptive devices for detecting deflection and sinking of said bars out of said predetermined height caused by weight of remaining cake on said filter cloth, said photoemissive device emitting a light beam which passes under said bars which are at said predetermined height.

5. The filter press according to claim 1, wherein each of said plurality of filter plates is provided at a lower end thereof with rotatable levers, said levers having free ends to which a wash head pipe is fixedly mounted, said wash head pipe being extended over said full width of said filter plate and provided with nozzles spaced along a full length of said head pipe.

6. The filter press according to claim 5, wherein at least one of said levers of said filter press is connected by transmission means to free ends of piston rods of a pair of fluid cylinders rotatably mounted on said frame structure, thereby said lever is rotated for facing said nozzles towards various parts of said filter plate when said piston rods are extruded and plunged.

7. A filter press provided with a plurality of filter plates supported vertically in a horizontal row in a frame structure and with filter cloth disposed between said filter plates for treating slurries introduced under pressure between said filter plates, the improvement comprising:
   a plurality of bars extending over a full width of said filter plates, each filter plate including spring means for movably mounting one of said bars to said filter plate between a position at a predetermined height above said filter plate for supporting said filter cloth and a position below said predetermined height,
   shafts movably mounted between said bars and said filter plates between a position raising said bars and a position disengaged from said bars,
   driving devices for moving said shafts,
   vibrating devices for vibrating said bars, and
   a pair of photoemissive devices and photoreceptive devices for detecting the location of said bars at said position below said predetermined height caused by the weight of remaining cake on said filter cloth, said photoemissive device emitting a light beam which passes under said bars which are at said predetermined height.

* * * * *